United States Patent [19]

Tokioka et al.

[11] Patent Number: 5,539,160

[45] Date of Patent: Jul. 23, 1996

[54] COORDINATE INPUT APPARATUS AND METHOD

[75] Inventors: Masaki Tokioka, Yokohama; Atsushi Tanaka, Kawasaki; Yuichiro Yoshimura, Kamakura; Kiyoshi Kaneko, Yokohama; Ryozo Yanagisawa, Matsudo; Katsuyuki Kobayashi, Yokohama, all of Japan

[73] Assignee: Canon Kabushiki Kaisha, Tokyo, Japan

[21] Appl. No.: 458,459

[22] Filed: Jun. 2, 1995

Related U.S. Application Data

[63] Continuation of Ser. No. 106,557, Aug. 16, 1993, abandoned.

[30] Foreign Application Priority Data

Aug. 20, 1992 [JP] Japan ................... 4-221770

[51] Int. Cl.$^6$ ................................. G08C 21/00
[52] U.S. Cl. ............................. 128/19; 345/177
[58] Field of Search ............... 178/18–20; 235/151; 245/157, 177, 175, 173, 174; 367/907

[56] References Cited

U.S. PATENT DOCUMENTS

| | | | |
|---|---|---|---|
| 3,504,334 | 3/1970 | Turnage | 340/16 |
| 3,587,022 | 12/1974 | Rebane et al. | 235/151 |
| 3,857,022 | 12/1974 | Rebane et al. | 235/151 |
| 4,887,245 | 12/1989 | Mori et al. | 367/129 |
| 4,931,965 | 6/1990 | Kaneko et al. | 364/560 |
| 5,073,685 | 12/1991 | Kobayashi et al. | 178/19 X |
| 5,097,415 | 3/1992 | Yoshimura et al. | 364/237 |
| 5,308,936 | 5/1994 | Biggs et al. | 178/19 X |

FOREIGN PATENT DOCUMENTS

2042726  9/1980  United Kingdom.

*Primary Examiner*—Stephen Chin
*Assistant Examiner*—Paul Loomis
*Attorney, Agent, or Firm*—Fitzpatrick, Cella, Harper & Scinto

[57] ABSTRACT

Oscillation applied to a tablet is sensed by a sensor on the tablet and a time delay from generation of the oscillation to the sensing thereof is measured, whereby distance from the oscillation source to the sensor can be measured. If this distance is measured for each of a plurality of different sensors, the position of the oscillation source on the tablet can be determined. The measured delay time includes not only time for transmission through the tablet but also an error. Accordingly, the delay time between the oscillation source and a sensor is not used as is, one of the sensors is adopted as a reference sensor and a difference in delay time between this sensor and the oscillation source is used to measure the distance between the oscillation source and each sensor. As a consequence, errors attributable to respective sensors are canceled out so that measurement precision is improved.

13 Claims, 10 Drawing Sheets

PEN WITH SW

FIG. 11B

PEN WITH SW

COORDINATE INPUT APPARATUS AND METHOD

This application is a continuation, of application Ser. No. 08/106,557, filed Aug. 16, 1993, now abandoned.

BACKGROUND OF THE INVENTION

1. Field of the Invention:

This invention relates to a coordinate input apparatus and method. More particularly, the invention relates to an apparatus and method for entering a coordinate position by detecting input oscillation and specifying the position of the oscillation source.

2. Description of the Related Art:

A method of entering coordinates utilizing ultrasonic oscillation is known in the art. In an apparatus that employs this coordinate input method, a material such as glass or metal is used as a tablet (an oscillation transmitting panel) that forms a coordinate input surface, and a plurality of oscillation sensors are arrayed on the tablet at prescribed positions.

Using an input pen having an oscillator, the operator designates a desired position on the tablet, whereby oscillation generated from the tip of the pen is caused to propagate along the tablet. Each oscillator senses this oscillation, and the time from application of oscillation to the tablet to sensing of this oscillation differs depending upon the distance between the input pen and each oscillation sensor. In other words, by measuring transmission delay time from emission of oscillation from the input pen to sensing of the oscillation by each oscillation sensor, the distance from each oscillation sensor to the location designated by the input pen is obtained, thus making it possible to obtain the coordinate position of the location designated by the input pen. The time from entry of oscillation to the sensing thereof is sometimes referred to simply as delay time.

This delay time from emission of oscillation from the input pen to sensing of the oscillation by each oscillation sensor is measured in order to determine the distance from each oscillation sensor to the location designated by the input pen. Strictly speaking, the transmission delay time measured includes the time needed for oscillation to propagate through the interior of the input pen and reach the tip of the pen. Since the delay time attributed to oscillation through the input pen is included equally in all of the transmission delay times associated with the plurality of oscillation sensors, at calculation of coordinates the former delay time is subtracted as an offset from the delay time associated with each sensor in order to determine the coordinates.

A problem which arises is that the transmission delay time of oscillation within the input pen varies owing to a change in the environment such as temperature, as a result of which the wrong coordinates are calculated. The reason for this is that the resin (selected to improve writing ease when the pen is used) used in the tip of the input pen transmits sound at a speed slower than that of a material such as glass used in the tablet. In addition, since a change in the speed of sound with temperature is conspicuous, the amount of change in oscillation delay time within the input pen caused by a change in temperature is much greater in comparison with that of the tablet.

Further, since the delay time until oscillation is sensed by each sensor is measured using the time at which oscillation is produced by the input pen as a reference point, it is required that oscillation of the input pen be produced in synchronism with the main body that senses this oscillation. Accordingly, even if the input pen is cordless, there is a need for separate cordless communication means for the purpose of establishing synchronism with the main body. This is a cause of higher cost.

SUMMARY OF THE INVENTION

Accordingly, an object of the present invention is to prevent a decline in coordinate-input precision due to a change in environment.

Another object of the present invention is to realize a low-cost cordless input pen.

According to the present invention, the foregoing objects are attained by providing a coordinate input apparatus for sensing a designated coordinate position, comprising oscillation transmission means for transmitting oscillation, a plurality of sensing means for sensing oscillation transmitted by the oscillation transmission means, measuring means for measuring time differences between a time at which reference sensing means senses a certain oscillation and times at which this oscillation is sensed by the other sensing means, wherein one of the plurality of sensing means serves as the reference sensing means, and means for calculating position of an oscillation source based upon the time differences measured by the measuring means.

The invention further provides an oscillation generating apparatus for generating oscillation, comprising signal generating means for generating a square-wave signal at a prescribed frequency, rectifying means for rectifying the square-wave signal generated by the signal generating means, and oscillating means for oscillating in phase with leading and trailing edges of the square wave on the basis of the signal rectified by the rectifying means.

The invention further provides a coordinate input method for detecting coordinate position from oscillation inputted on an oscillation transmitting tablet, comprising a detecting step of detecting oscillation, which is transmitted by the oscillation transmitting tablet, at a plurality of mutually different positions, a measuring step of measuring time differences between a time at which a certain oscillation is sensed at a reference position and times at which this oscillation is sensed at positions other than the reference position, wherein one of the plurality of positions serves as the reference position, and a step of calculating position of an oscillation source based upon the time differences measured at the measuring step.

The coordinate input apparatus described above is capable of preventing a decline in coordinate input precision caused by a change in environment.

Furthermore, the structure of the cordless input pen can be simplified and power consumption can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

FIRST EMBODIMENT

Figure 1:
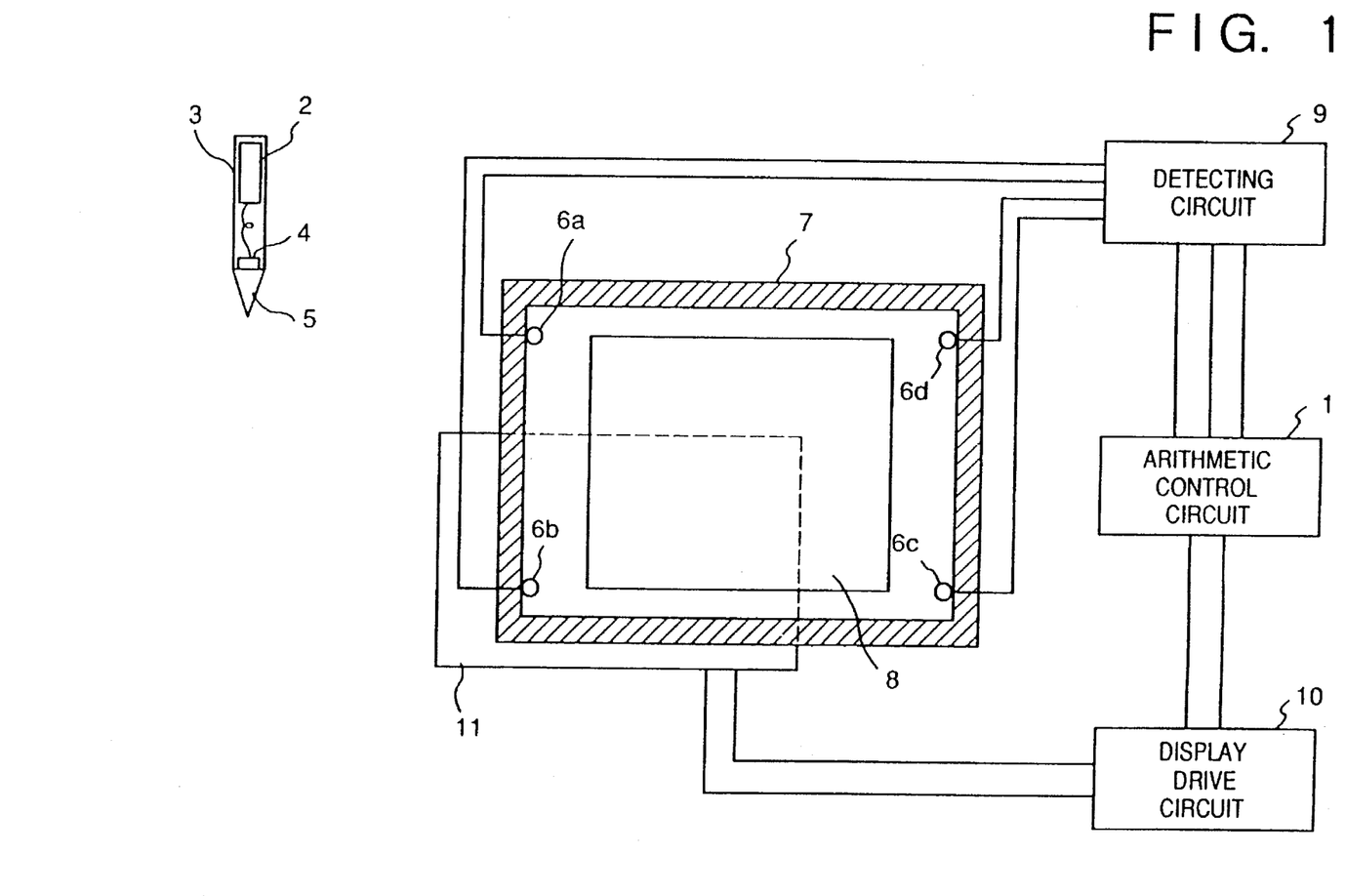
FIG. 1 is a diagram for describing the general features of a coordinate input apparatus according to an embodiment of the present invention.

FIG. 1 is a diagram for describing the general features of a coordinate input apparatus according to an embodiment of the present invention. As shown in FIG. 1, an arithmetic control circuit 1 controls the overall apparatus and calculates coordinates. A drive circuit 2 is accommodated within an oscillating pen 3 and drives an oscillator 4 within the pen 3 to as to oscillate a pen tip 5. A tablet 8 comprises a transparent member consisting of an acrylic or glass plate and serves to transmit oscillation, which is applied by the oscillating pen 3, to sensors. A coordinate input is performed by bringing the oscillating pen 3 into contact with the oscillation transmitting tablet 8. More specifically, a desired position within an area (effective area) A, which is indicated by the solid line in FIG. 1, is designated by the operator using the oscillating pen 3, whereby the oscillation generated by the oscillating pen 3 is applied to the tablet 8. The applied oscillation is measured and processed by the apparatus of this embodiment, whereby the positional coordinates of the oscillating pen 3 are capable of being calculated.

Waves that have been transmitted through the oscillation transmitting tablet 8 are reflected at the end face of the tablet 8. In order to prevent these reflected waves from returning to the central portion of the tablet (or to reduce such return), a oscillation suppresser 7 is provided on the outer periphery of the oscillation transmitting tablet 8. As illustrated in FIG. 1, oscillation sensors 6a~6d, such as piezoelectric elements, for converting mechanical oscillation into electrical signals are secured to the tablet on the inner side of the oscillation suppresser 7 and in close proximity thereto. A detecting circuit 9 detects signals indicative of oscillation sensed by each of the oscillation sensors 6a~6d, and produces output signals applied to the arithmetic control circuit 1. A display 11 such as a liquid-crystal display device is capable of presenting a display in dot units and is disposed in back of the oscillation transmitting tablet 8. The display 11 is driven by a display drive circuit 10 and displays dots at positions traced by the oscillating pen 3. The operator is capable of seeing the display 11 through the oscillation transmitting tablet 8 (which is transparent).

Figure 2:
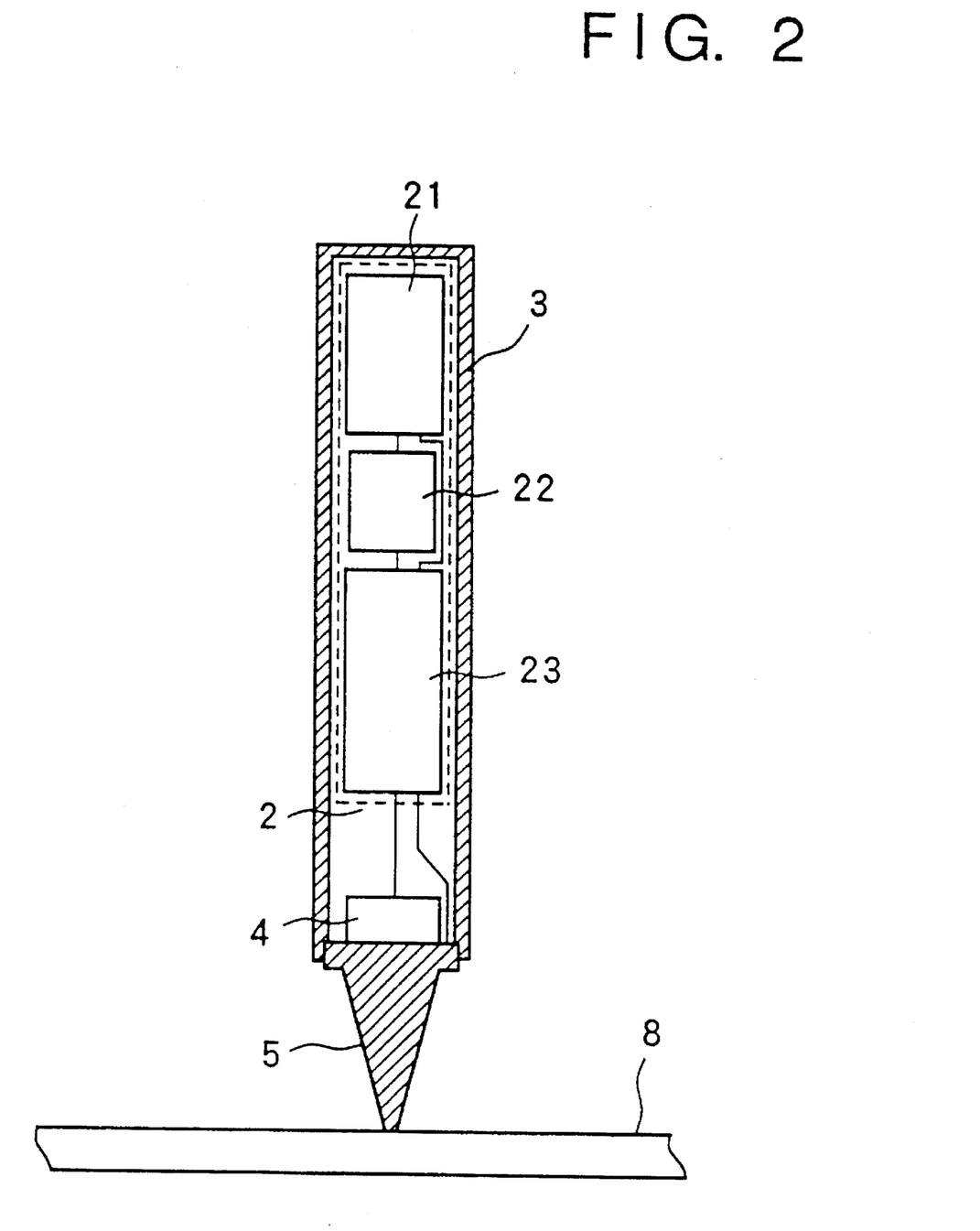
FIG. 2 is a diagram for describing the general features of an oscillating pen.

As shown in FIG. 2, the oscillator 4 housed within the oscillating pen 3 is driven by the drive circuit 2, which comprises a pen power supply 21, a pen timer 22 and an oscillator circuit 23. A pulse signal that repeats at any prescribed period generated by the pen timer 22 is amplified at a prescribed gain by the oscillator circuit 23, after which the amplified signal is applied to the oscillator 4. The repetition timing of the drive signal is not particularly synchronized to the arithmetic control circuit 1. The pen timer 22 and oscillator circuit 23 are supplied with electric power by the pen power supply 21, which is constituted by a battery housed within the oscillating pen 3. The electrical drive signal is converted into mechanical oscillation by the oscillator 4, and the mechanical oscillation is transmitted to the tablet 8 via the pen tip 5.

The oscillation frequency of the oscillator 4 is selected to have a value capable of generating Lamb waves in the tablet 8, which consists of glass or the like. When the oscillator is driven, a mode in which the oscillator oscillates in the vertical direction in FIG. 2 with respect to the tablet 8 is selected. Highly efficient conversion of oscillation is possible by making the oscillation frequency of the oscillator 4 the resonance frequency of the pen tip 5. The elastic waves transmitted through the tablet 8 are Lamb waves, which are advantageous in that they are less susceptible than surface waves or the like to the influence of scratches in the surface of the oscillation transmitting tablet, obstacles and the like.

DESCRIPTION OF ARITHMETIC CONTROL CIRCUIT

In the arrangement set forth above, the drive circuit 2 outputs a signal, which drives the oscillator 4 within the oscillating pen 3, at a prescribed period (e.g., every 5 ms). The oscillation produced by the oscillating pen 3 propagates through the oscillation transmitting tablet 8 and arrives at the oscillation sensors 6a~6d upon being delayed a period of time commensurate with distance from the oscillation source.

The detecting circuit 9 detects the signal from each of the oscillation sensors 6a~6d and, by wave-detection processing described below, generates a signal indicative of each time difference between an oscillation transmission timing, namely a timing at which oscillation is transmitted to the oscillation sensor 6a, which serves as a reference, and oscillation transmission timings at which the oscillation is transmitted to the other sensors 6b~6d. These time-difference signals for all combinations of the sensors enter the arithmetic control circuit 1, which clocks the differences between the oscillation arrival time of the reference oscillation sensor, namely the oscillation sensor 6a, and the oscillation arrival times of the other oscillation sensors 6b~6d, and calculates the coordinates of the oscillating pen based upon these time differences. Further, the arithmetic control circuit 1 drives the display drive circuit 10 on the basis of the calculated information indicative of the position of the oscillation sensor 3, thereby controlling the display presented by the display 11. Alternatively, the arithmetic control circuit 1 outputs the coordinates to an external unit (not shown) by serial or parallel communication.

Figure 3:
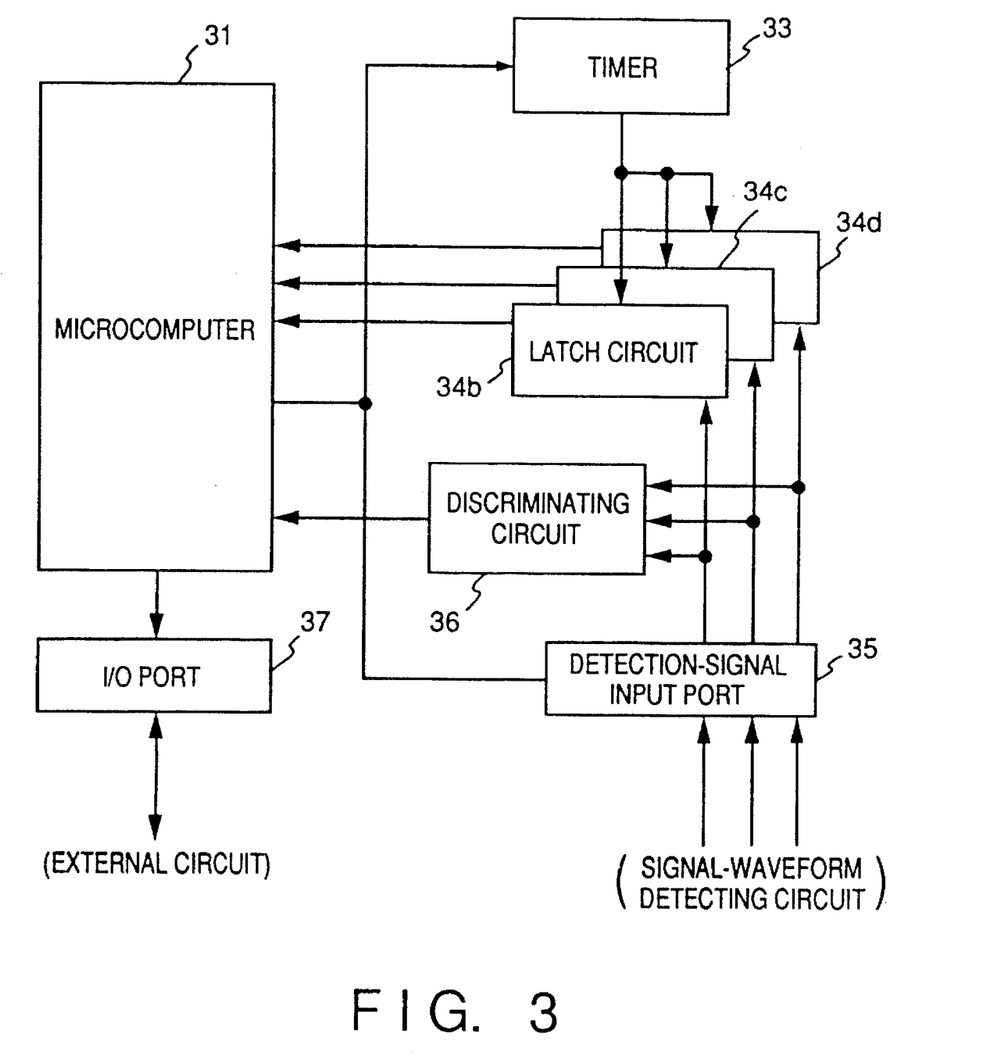
FIG. 3 is a block diagram illustrating the construction of an arithmetic control circuit.

FIG. 3 is a block diagram illustrating the general configuration of the arithmetic control circuit 1 according to this embodiment.

As shown in FIG. 3, a microcomputer 31 controls the arithmetic control circuit 1 and the overall coordinate input apparatus. The microcomputer 31 is constituted by an internal counter, a ROM storing the operating procedure, a RAM used in calculations and a non-volatile memory for storing constants and the like. A timer 33 is constituted by a counter, for example, and counts a reference clock (not shown). The time-difference signals between the reference sensor, namely the oscillation sensor 6a in this embodiment, and the other oscillation sensors 6b–6d enter the timer 33, which measures the difference in time between the timing at which oscillation applied by the oscillating pen 3 is sensed by the sensor 6a and the timings at which this oscillation is sensed by the sensors 6b–6d.

Other circuits constructing the apparatus will be described in due course.

The time-difference signals, which are outputted by the detecting circuit 9, between the oscillation arrival timings of the oscillation sensor 6a and oscillation sensors 6b–6d enter respective latches 34b–34d via a detection-signal input port 35. The latch circuits 34b–34d correspond to the oscillation sensors 6b–6d, respectively, and serve to latch the value clocked by the timer 33 while the time-difference signal between the corresponding sensor and the reference sensor 6a is being received. When a discriminating circuit 36 determines that reception of a time-difference signal has been performed with regard to all of the sensors, the circuit 36 outputs a signal to this effect to the microcomputer 31. In response to the signal from the discriminating circuit 36, the microcomputer 31 reads the time-difference signals for the respective sensors out of the latch circuits 34b–34d and performs a predetermined calculation so as to calculate the coordinates of the oscillating pen 3 on the oscillation transmitting tablet 8. The calculated coordinate information is outputted to the display drive circuit 10 via an I/O port 37, thereby making it possible to display dots or the like at the corresponding position of the display 11. Alternatively, the coordinate information is outputted to an interface circuit (not shown) via the I/O circuit 37, whereby the coordinate values can be outputted to an external device.

Figure 4:
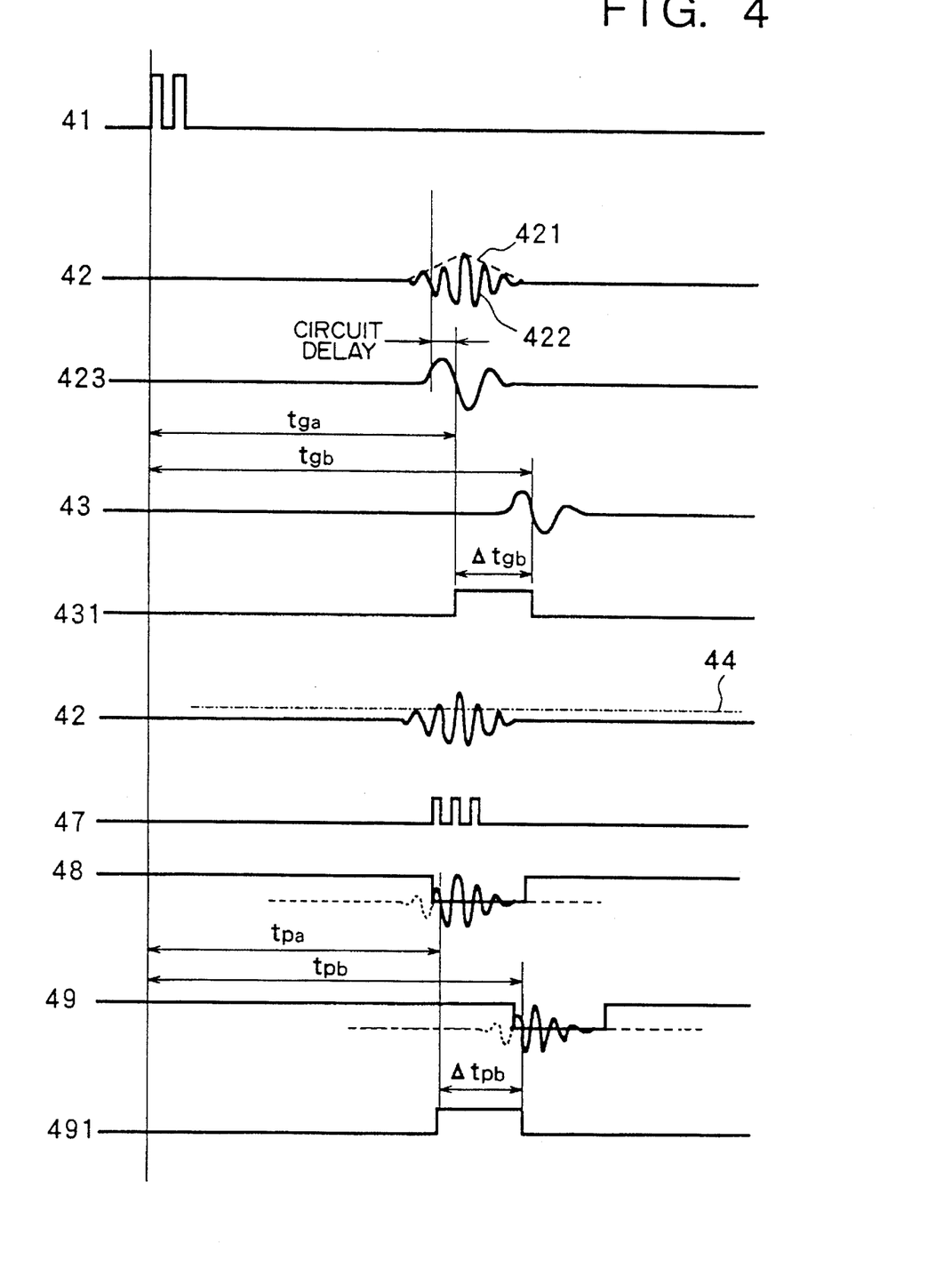
FIG. 4 is a timing chart of signal processing.
Figure 5:
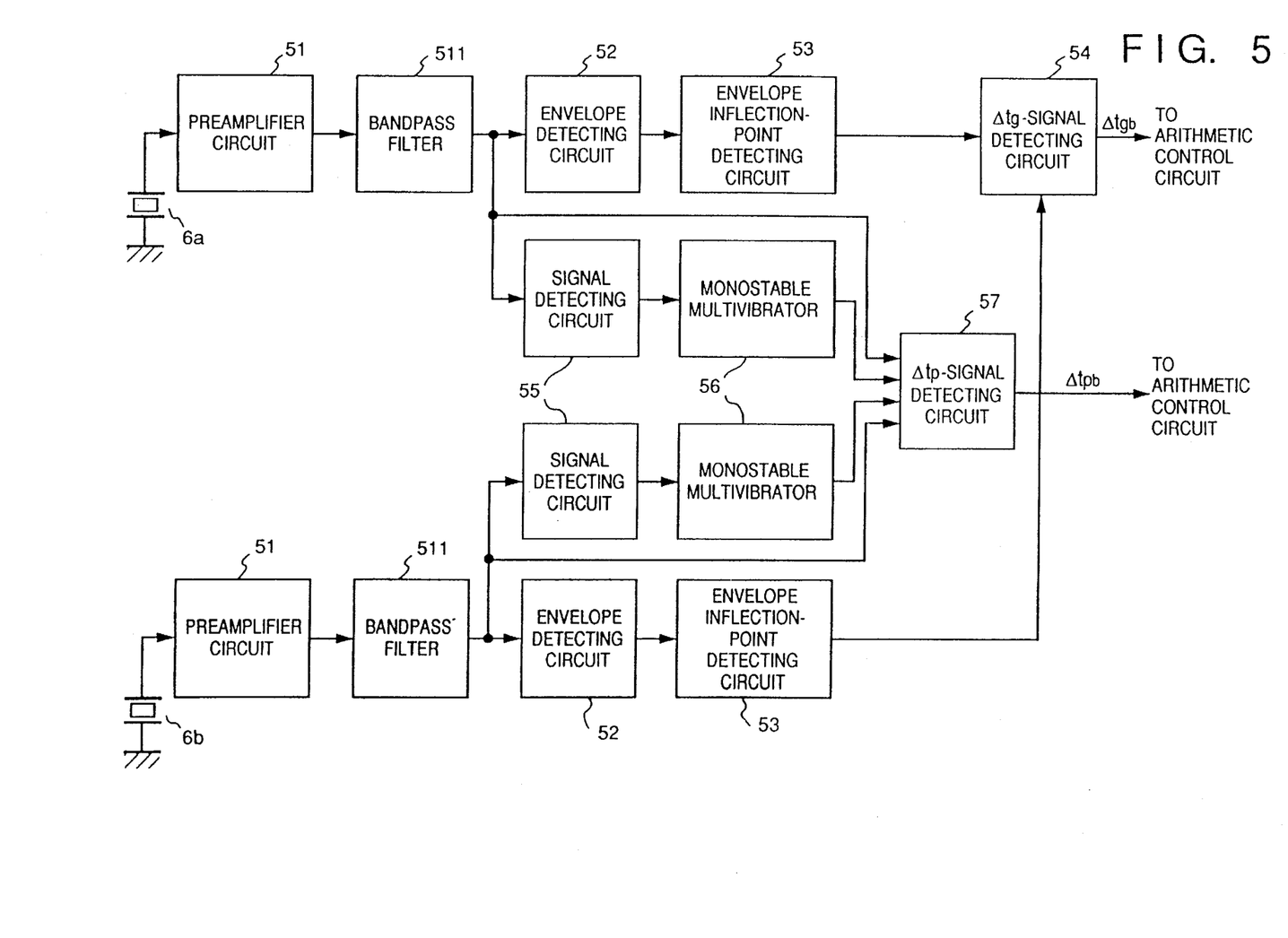
FIG. 5 is a block diagram illustrating the construction of a signal-waveform detecting circuit.

DESCRIPTION OF DETECTION OF OSCILLATION PROPAGATION TIME (FIGS. 4, 5)

The principle through which oscillation arrival time with respect to the oscillation sensor 3 is measured will now be described.

FIG. 4 is a diagram for describing detection waveforms that enter the detecting circuit 9 and the processing for measuring transmission delay time based upon these waveforms. Though a case in which the time difference between oscillation sensors 6a and 6b is detected will be described, operation is exactly the same with regard to the other oscillation sensors 6c and 6d as well. A drive signal 41 from the drive circuit 2 is applied to the oscillator 4 at a period completely out of synchronism with the detecting circuit 9. Ultrasonic oscillation produced by the signal 41 and transmitted from the oscillating pen 3 to the oscillation transmitting tablet 8 advances in a period of time $tg_a$ commensurate with the distance to the oscillation sensor 6a, after which the oscillation is sensed by the sensor 6a.

Waveform 42 in FIG. 4 indicates the signal waveform sensed by the oscillation sensor 6a. Since the oscillation used in this embodiment is a Lamb wave, the relationship between an envelope 421 and phase 422 of the sensed waveform with respect to propagation distance within the oscillation transmitting tablet 8 varies in dependence upon the transmission distance during transmission of the oscillation. Let Vg represent the speed at which the envelope 421 advances, namely the group velocity, and let Vp represent the phase velocity of the phase 422. The distance between the oscillating pen 3 and the oscillation sensor 6a can be detected from the group velocity Vg and phase velocity Vp.

First, attention is directed solely to the envelope 421, the velocity of which is Vg. When the sensor 6a senses a specific point on the waveform, e.g., the zero-cross point of a second-order differential waveform 423 of the envelope 421, namely the inflection point of the envelope waveform, the distance $d_a$ between the oscillating pen 3 and the oscillation sensor 6a is given by the following equation, in which the transmission delay time is represented by $tg_a$:

$$d_a = Vg \cdot tg_a \tag{1}$$

Though this equation relates to the oscillation sensor 6a, the distances between the other three oscillation sensors 6b–6d and the oscillating pen 3 can be expressed in a similar manner. A difference Δdb between the distance $d_a$ between the oscillation sensor 6a and oscillating pen 3 and a distance $d_b$ between the oscillation sensor 6b and oscillating pen 3 is given by the following equation, which is based upon the difference between the delay time $tg_a$ and a transmission delay time 43 ($tg_b$) regarding the sensor 6b, namely a difference 431 ($\Delta tg_b$) between the transmission delay times:

$$\Delta db = Vg \cdot tg_b - Vg \cdot tg_a = Vg \cdot \Delta tg_b \tag{2}$$

Furthermore, processing based upon detection of the phase signal is executed in order to decide the coordinate more accurately. Let $tp_a$ represent the time up to a specific detection point on the phase waveform signal 422, e.g., namely a zero-cross point after the sensor 6a has sensed a predetermined signal level 44 following application of oscillation by the pen 3. The distance between the oscillation sensor and the oscillating pen is given by the following equation:

$$da = na \cdot \lambda p + Vp \cdot tp_a \tag{3}$$

where λp represents the wavelength of the elastic wave and na is an integer. Further, $tp_a$ is obtained by generating a window signal 48 of a prescribed width with respect to the initial leading edge of a signal 47, which is obtained by comparing the signal 42 and the threshold value 44, and comparing the signal 48 with the phase signal 422. Let the distance difference Δdb between the sensors 6a and 6b be represented by the difference $\Delta tp_b$ between $tp_a$ and the delay time $tp_b$ of the sensor 6b as sensed in the same manner as sensor 6a. Accordingly, we have $$\Delta db = nb \cdot \lambda p + Vp \cdot tp_b - (na \cdot \lambda p + Vp \cdot tp_a) = (nb-na) \cdot \lambda p + Vp \cdot (tp_b - tp_a) = nb' \cdot \lambda p + Vp \cdot \Delta tp_b \tag{4}$$

where nb' has the value of an integer similar to nb or na.

The integer nb' may be expressed as follows from Equations (2) and (4):

$$nb' = int[(Vg \cdot \Delta tg_b - Vp \cdot \Delta tp_b)/\lambda p + 1/N] \tag{5}$$

It should be noted that N is a real number other than "0". Any appropriate value may be used. For example, if N=2 holds, nb' can be decided when there is fluctuation of tg or the like within ±½ wavelength. By substituting nb' thus obtained into Equation (4), the difference Δdb between the difference separating the oscillating pen 3 and oscillation sensor 6a and the difference separating the pen 3 and sensor 6b can be measured with greater accuracy. In order to measure differences $\Delta tg_x$ and $\Delta tp_x$ (x=a, ..., d) between the above-mentioned two oscillation transmission times, signals 431 and 491 are generated by the detecting circuit 9. The detecting circuit 9 is constructed as shown in FIG. 5.

FIG. 5 is a block diagram showing part of the arrangement of the detecting circuit 9 according to this embodiment. FIG. 5 illustrates circuitry for detecting the arrival delay-time differences $\Delta tgb$, $\Delta tpb$ in the oscillation sensors 6a and 6b. Identical circuit elements regarding the sensors 6a, 6b and the sensors 6a, 6d also are included in the signal-waveform detecting circuit 9. In FIG. 5, the output signals of the oscillation sensors 6a, 6b are amplified to a prescribed level by preamplifier circuits 51. The amplified signals are applied to bandpass filters 511, which remove unnecessary frequency components from the detection signals. The filtered signals enter envelope detecting circuits 52, which are composed of an absolute-value circuit and a low-pass filter, etc., whereby only the envelopes of the detection signals are extracted. The timing of the inflection point of each envelope is detected by an envelope inflection-point detecting circuit 53. The outputs of the envelope inflection-point detecting circuits 53 enter a $\Delta tg$ signal detecting circuit 54 comprising a multivibrator and the like. This circuit produces the signal $\Delta tg_b$ (signal 431 in FIG. 4), which indicates the time difference detected based upon the envelopes of the two sensors. The signal $\Delta tg_b$ is applied to the arithmetic control circuit 1.

Signal detecting circuits 55 produce pulse signals 47 which exceed the threshold-value signal 44 of the prescribed level in the signal waveform 42 sensed by the oscillation sensor 6a. Monostable multivibrators 56 open a gate signal 48 of a prescribed duration triggered by the first leading edge of the pulse signal 47. A $\Delta tp$-signal detecting circuit 57 detects the zero-cross point of the first leading edge of the phase signal 422 while the gate signal 48 is open. If a signal similarly detected also with regard to the oscillation sensor 6b enters, the signal $\Delta tpb$ 491 indicative of the phase-delay time difference between the two sensors is supplied to the arithmetic control circuit 1. It should be noted that the above-described circuit is for the oscillation sensors 6a and 6b, and that identical circuits are provided for the other two combinations of the oscillation sensors.

The signals $\Delta tp$, $\Delta tg$ outputted by the detecting circuit 9 are both difference signals. As a consequence, shared errors with regard to each of the sensors are not incorporated in the signals $\Delta tp$, $\Delta tg$, as in the manner of the delay within the oscillating pen 3.

Figure 6:
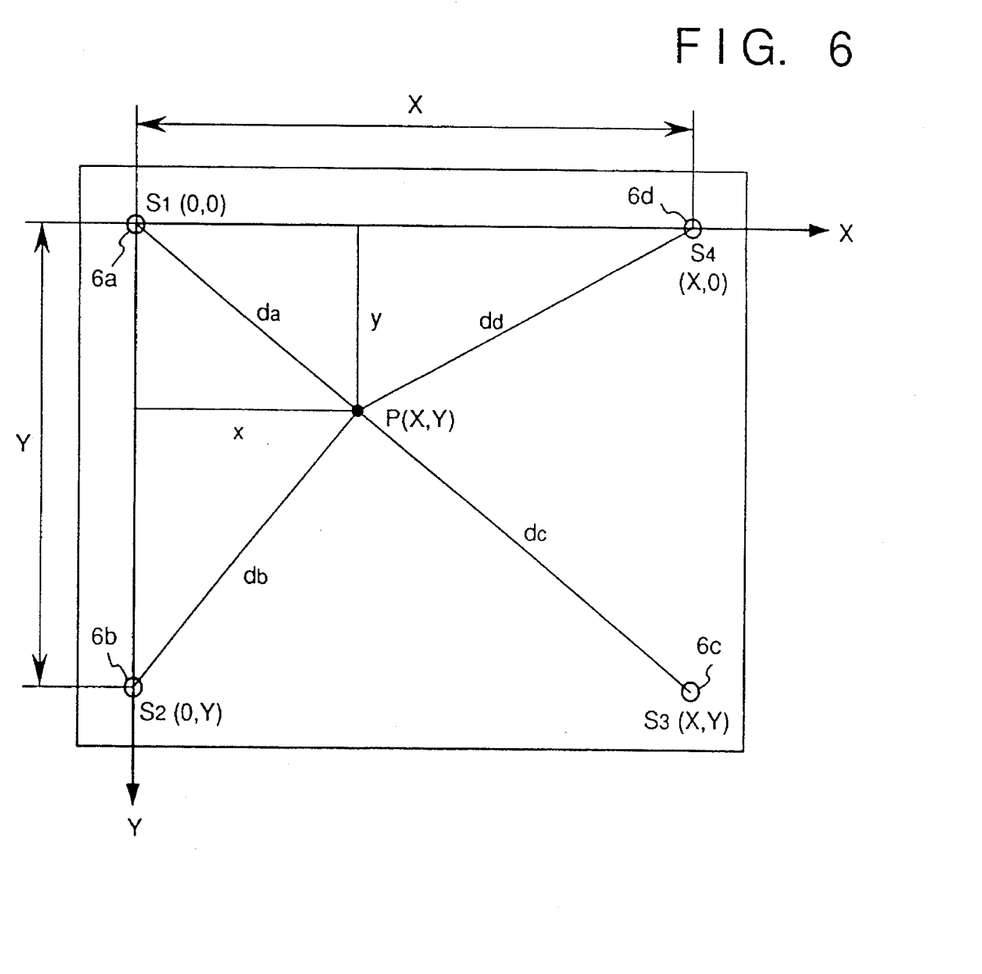
FIG. 6 is a diagram for describing calculation of coordinate position.

DESCRIPTION OF COORDINATE CALCULATION (FIG. 6)

The principle through which coordinates are actually detected on the oscillation transmitting tablet 8 by the oscillating pen 3 will now be described.

The four oscillation sensors 6a~6d are provided at positions S1~S4, respectively, located in the four corners of the oscillation transmitting tablet 8. Let $d_a$~$d_d$ represent the straight-line distances from the position P of the oscillating pen 3 to the positions of the oscillation sensors 6a~6d, respectively. On the basis of the principle described above, differences $\Delta d_b$~$\Delta d_d$ between the distance $d_a$ separating the sensor 6a and the pen 3 and the distances $d_b$~$d_d$ separating the other sensors and the pen 3 can be obtained. On the basis of these straight-line distances $d_a$~$d_d$, the arithmetic control circuit 1 is capable of obtaining coordinates (x,y) of the position P of the oscillating pen 3 in the following manner using the *Pythagorean theorem:*

First, letting $d_b$~$d_d$ represent the calculated $\Delta d_b$~$\Delta d_d$, we have $$d_b = \Delta d_b + d_a \quad (6)$$

$$d_c = \Delta d_c + d_a \quad (7)$$

$$d_d = \Delta d_d + d_a \quad (8)$$

Further, we have $$d_a^2 = x^2 + y^2 \quad (9)$$

$$d_b^2 = (\Delta d_b + d_a)^2 = x^2 + (Y-y)^2 \quad (10)$$

$$d_c^2 = (\Delta d_c + d_a)^2 = (X-x)^2 + (Y-y)^2 \quad (11)$$

$$d_d^2 = (\Delta d_d + d_a)^2 = (X-x)^2 + y^2 \quad (12)$$

where X, Y represent the distances between the oscillation sensors 6a, 6d and between the oscillation sensors 6c, 6d, respectively.

Next, from (10)–(9), (11)–(12), we have $$i\ \Delta d_b^2 + 2d_a \cdot \Delta d_b = Y^2 - 2Y \cdot y \quad (13)$$

$$\Delta d_c^2 - \Delta d_d^2 + 2d_a \cdot (\Delta d_c - \Delta d_d) = Y^2 - 2Y \cdot y \quad (14)$$

The following equation is obtained when $d_a$ is found by taking the difference between these two equations:

$$d_a = -(\Delta d_b^2 + \Delta d_d^2 - \Delta d_c^2)/(\Delta d_d + \Delta d_b - \Delta d_c) \quad (15)$$

This equation holds when the denominator on the right side is non-zero. The method of solution when the denominator is zero is described below. Substituting Equation (15) into Equation (14), we obtain y as indicated by the following equation:

$$\Delta db \cdot (\Delta d_b^2 + \Delta d_d^2 - \Delta d_c^2)/(\Delta d_d + \Delta d_b - \Delta d_c)Y \quad (16)$$

When x is found through a similar method, we have $$x = X/2 - \Delta d_d^2/2X + \Delta d_d^d \cdot (\Delta d_b^2 + \Delta d_d^2 - \Delta d_c^2)/(\Delta d_d + \Delta d_b - \Delta d_c)/X \quad (17)$$

As in the case of Equation (15), Equation (17) holds true when the following holds:

$$\Delta d_d + \Delta d_b - \Delta d_c \neq 0 \quad (18)$$

A case in which Equation (18) is not satisfied will now be considered. When Equations (6)–(8) are substituted into Equation (18), we have $$d_d + d_b = d_c + d_a \quad (19)$$

when the right side is zero. This holds true only when x=X/2 or y=Y/2 holds and when $d_a = d_d$ and $d_b = d_c$ or $d_a = d_b$ and $d_{c=dd}$ hold. In actuality, since the time resolving power of the detecting circuit 9 is limited, the value of zero is adopted with a certain amount of margin (=).

When it is judged that Equation (18) does not hold, the system jumps to a subroutine for coordinate-calculation processing. Though this is somewhat complicated, a solution is obtained by setting up a quadratic equation for x or y.

First, when x=X/2 holds ($\Delta db = \Delta dc$ holds at this time), Equations (9)~(12) become the following two equations:

$$d_a^2 = X^2/4 + y^2 \quad (20)$$

$$(\Delta d_b + d_a)^2 = X^2/4 + (Y-y)^2 \quad (21)$$

By substituting $d_a$ obtained from (21)–(20) into Equation (20), y is obtained as the following equation:

$$y = [Y \pm sqrt(A)]/2 \quad (22)$$

where $$A = \Delta d_b^2 \cdot [1 + X^2/(Y^2 - \Delta d_b^2)] \quad (23)$$

The sign of Equation (22) is "−" when $\Delta d_b > 0$ holds and "+" when $\Delta d_b < 0$ holds. Further, "sqrt (X) is a function that gives the square root of X.

Similarly, when y=Y/2 holds, x is obtained as follows:

$$x = [X \pm sqrt(B)]/2 \quad (24)$$

where $$B = \Delta d_d^2 \cdot [1 + Y^2/(X^2 - \Delta d_d^2)] \quad (25)$$

where the sign of Equation (24) is "−" when $\Delta d_d > 0$ holds and "+" when $\Delta d_d < 0$ holds.

Thus, the positional coordinates of the oscillating pen 3 can be detected on a real-time basis.

It is possible to also obtain coordinates on a real-time basis from a signal representing the transmission delay-time difference between sensors. In this case, the time for propagation of oscillation through the interior of the pen 3 is negligible owing to cancellation between the two sensors. Consequently, there is no influence upon transmission delay time within the pen (particularly the pen tip) due to a change in temperature. Accordingly, the coordinate input apparatus of the present invention is advantageous in that erroneous input due to an environmental change is eliminated and there is no decline in precision caused by such environmental change. Further, since entry of oscillation from the oscillation pen can be performed asynchronously of the main body of the coordinate input apparatus, the pen can be made cordless.

According to the present invention, the oscillating pen 3 is one not connected to the main body of the apparatus. However, it goes without saying that an arrangement can be adopted in which the cord is connected to transmit the drive signal from the main body.

Further, the oscillation sensor serving as the reference sensor need not be the sensor 6a. It is obvious that any desired sensor on the oscillation transmitting tablet 8 made be adopted as the reference, the difference in transmission delay times between this sensor and the other sensors can be measured and coordinates can be calculated based upon these measured values.

SECOND EMBODIMENT

The configuration of this embodiment is identical with that of the first embodiment in terms of the overall construction of the coordinate input apparatus and the construction of the oscillating pen, though the construction of the signal-waveform detecting circuit 9 is different.

DESCRIPTION OF ARITHMETIC CONTROL CIRCUIT

Figure 7:
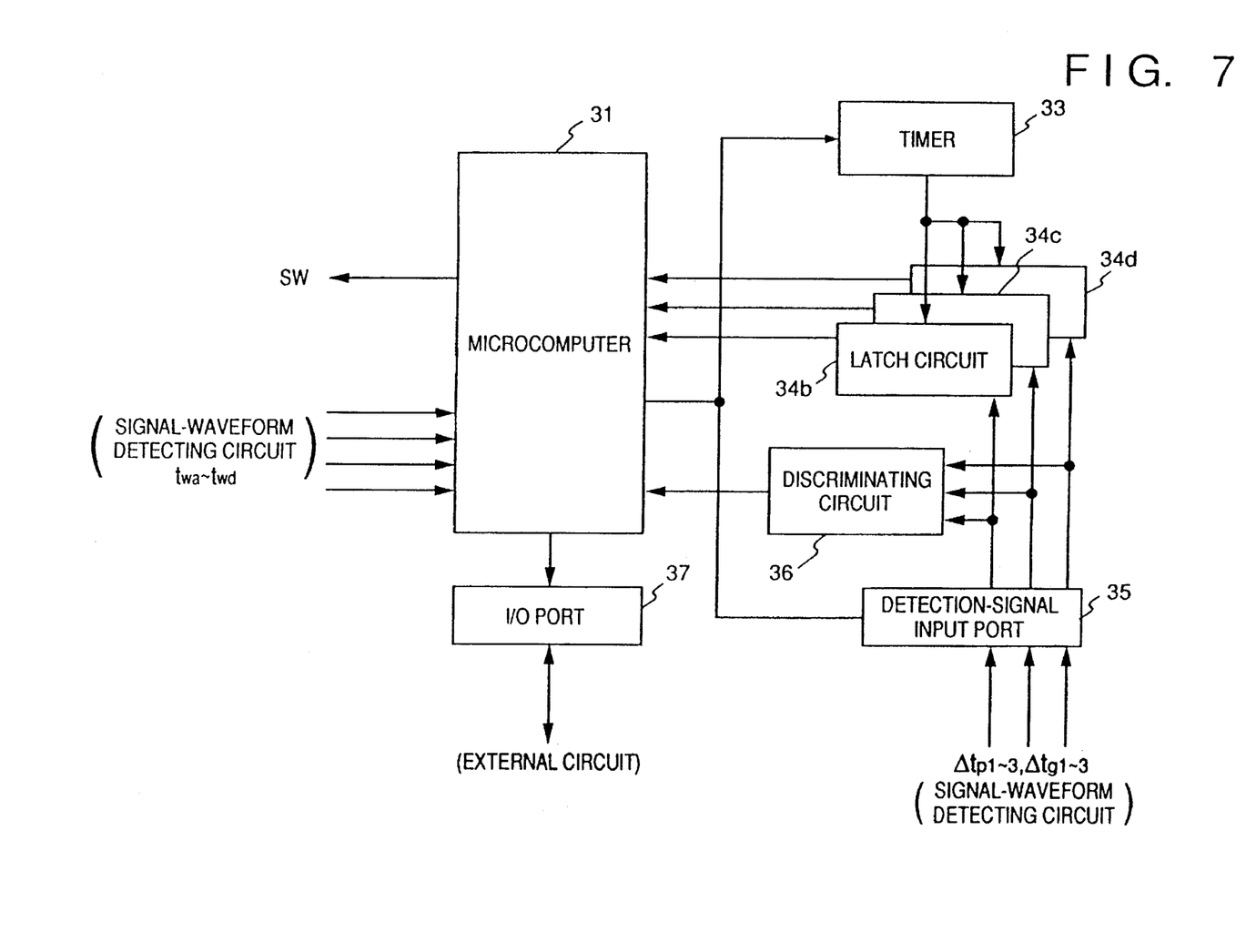
FIG. 7 is a block diagram illustrating the construction of an arithmetic control circuit according to another embodiment of the invention.

FIG. 7 is a block diagram illustrating the construction of the arithmetic control circuit according to another embodiment of the invention.

As shown in FIG. 7, signals $t_{wa} \sim t_{wd}$ from the signal-waveform detecting circuit 9 enter the microcomputer 31 from the sensors 6a~6d, respectively. The microcomputer 31 compares the signals $t_{wa} \sim t_{wd}$, selects the sensor which has sensed oscillation fastest as the reference sensor among the sensors 6a~6d and outputs a signal sw corresponding to the reference sensor selected. This signal is delivered to the signal-waveform detecting circuit 9.

The timer 33 measures the oscillation transmission-delay difference signals between the reference sensor and the other sensors until oscillation is sensed.

The difference signals indicative of the transmission delay times between the reference sensor and other sensors inputted from the oscillation-waveform detecting circuit 9 enter the latch circuits 34b~34d via the detection-signal input port 35. The latch circuits 34b~34d correspond to the respective oscillation sensors other than the reference sensor and serve to latch the timekeeping value from the timer 33 while the difference signals indicative of the transmission delay times between the corresponding sensors and the reference sensor 6a are being received. When the discriminating circuit 36 determines that reception of a difference signal has been performed with regard to all of the sensors, the circuit 36 outputs a signal to this effect to the microcomputer 31. In response to the signal from the discriminating circuit 36, the microcomputer 31 reads the delay-time differences out of the latch circuits 34b~34d and performs a predetermined calculation so as to calculate the coordinates of the oscillating pen 3 on the oscillation transmitting tablet 8. The calculated coordinate information is outputted to the display drive circuit 10 via the I/O port 37, thereby making it possible to display dots or the like at the corresponding position of the display 11. Alternatively, the coordinate information is outputted to an interface circuit via the I/O circuit 37, whereby the coordinate values can be outputted to an external device.

DESCRIPTION OF DETECTION OF OSCILLATION PROPAGATION TIME

Detection of oscillation propagation time is performed through a procedure almost the same as that of the first embodiment. According to the first embodiment, a specific sensor is adopted as the reference and a difference in delay time at which oscillation is sensed by the reference sensor and other sensors is detected. In the second embodiment, however, a specific sensor is not employed as a reference. Rather, a sensor that senses a single oscillation earliest is adopted as the reference in order to detect the delay times.

Figure 8:
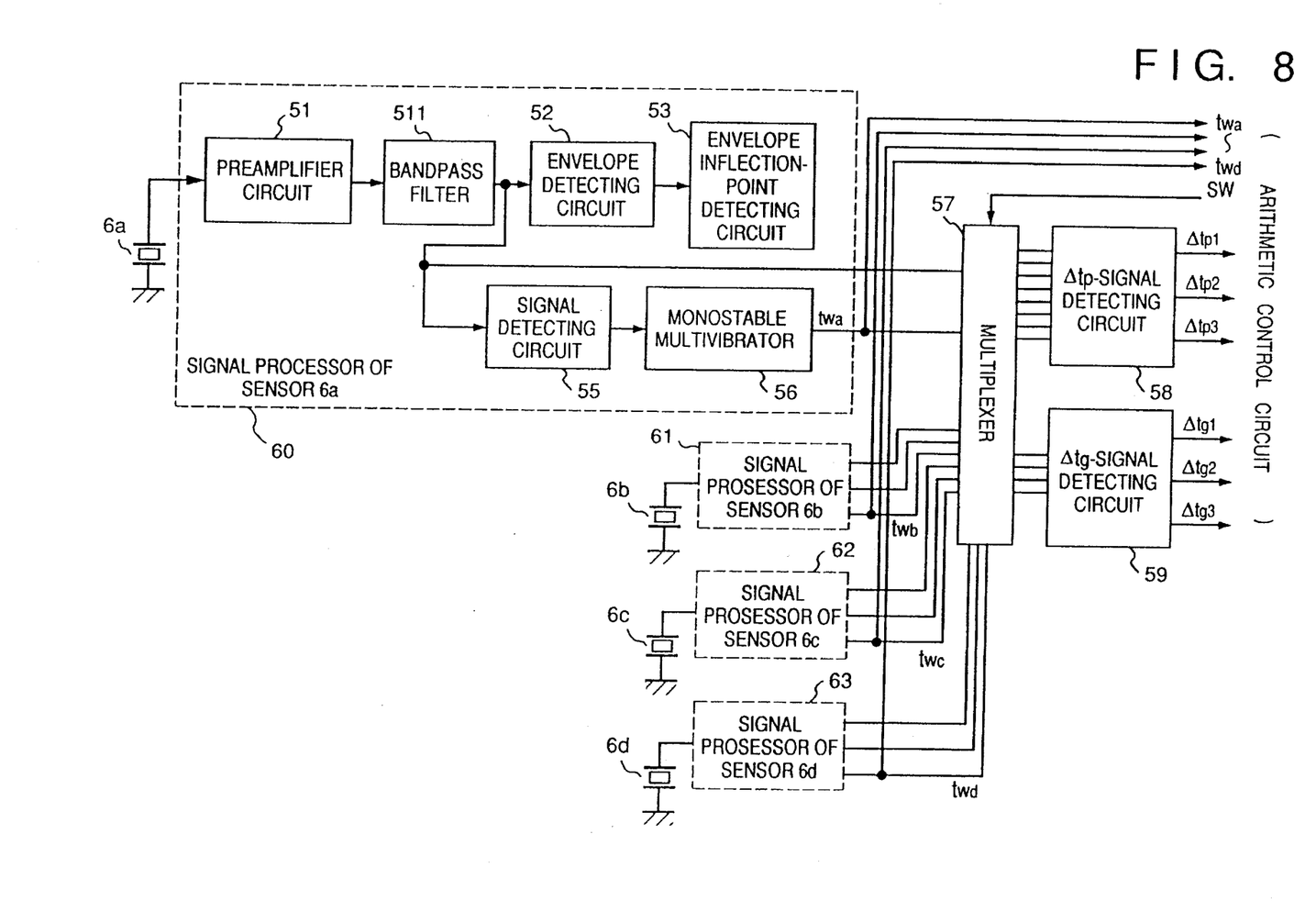
FIG. 8 is a block diagram illustrating the construction of a signal-waveform detecting circuit according to another embodiment of the invention.

FIG. 8 is a block diagram illustrating the construction of the signal-waveform detecting circuit 9 according to the second embodiment of the invention.

In the description that follows, FIG. 4 is referred to along with FIG. 8.

As shown in FIG. 8, signal processors 60~63 are provided for respective ones of the oscillation sensors. The description will be rendered taking sensor 6a as an example. The signal processor 60 corresponding to this sensor internally amplifies the output of the oscillation sensor 6a to a prescribed level by the preamplifier 51. The amplified signal is applied to the bandpass filter 511, which removes unnecessary frequency components from the detection signal. The filtered signal enters the envelope detecting circuit 52, which is composed of the absolute-value circuit and low-pass filter, etc., whereby only the envelope of the detection signal is extracted. The timing of the inflection point of the envelope is detected by the envelope inflection-point detecting circuit 53.

The signal detecting circuit 55 produces the pulse signal 44 which exceeds the threshold-value signal 44 of the prescribed level in the signal waveform 42 sensed by the oscillation sensor 6a. The monostable multivibrator 56 opens the gate signal 48 (tw) of a prescribed duration triggered by the first leading edge of the pulse signal 47. The gate signals $tw_a$–$tw_d$ from the sensors enter the arithmetic control circuit 1 as well. In a case where the arithmetic control circuit 1 selects the sensor 6a, for example, as the sensor which oscillation reaches earliest (or with the least delay), the microcomputer 31 of the arithmetic control circuit 1 outputs the signal sw indicating that the sensor 6a is the reference sensor. In response to the signal sw from the arithmetic control circuit 1, a multiplexer 57 is switched so as to select the three combinations of signals involving the sensor 6a and the other sensors. These signals are delivered to a Δtp-signal detecting circuit 58 and a Δtg-signal detecting circuit 59.

The Δtg-signal detecting circuit 59, which is constituted by a monostable multivibrator or the like, produces time-difference signals $\Delta tg_1$–$\Delta tg_3$ (in FIG. 4, the difference signal 431 between the reference sensor 6a and sensor 6b) when the envelopes between the reference sensor 6a and the other sensors are detected. These signals enter the arithmetic control circuit 1.

The Δtp-signal detecting circuit 58 detects the zero-cross point of the first leading edge of the phase signal 422 while the gate signal 48 of the selected reference signal 6a is open. Similarly, the zero-cross point is detected with regard to the oscillation sensor 6b. A signal $\Delta tp_1$ indicative of the phase-delay time difference between the two sensors is supplied to the arithmetic control circuit 1 based upon the time difference between these cross-points. It should be noted that the above-mentioned signal relates to the oscillation sensors 6a and 6b, and that signals $\Delta tp_2$ and $\Delta tp_3$ are produced through the same procedure for the two combinations involving the other oscillation sensors.

The signal group thus obtained is a signal group the meaning of which is the same as in the first embodiment. For example, if the sensor 6a is adopted as the reference, coordinates can be obtained based upon the Equations (1)–(25) described in the first embodiment. Further, coordinates can be calculated in the same manner even if the reference sensor is the sensor 6b, 6c or 6d.

As set forth above, the coordinate input apparatus according to this embodiment is capable of directly obtaining coordinates, on a real-time basis, from difference signals representing differences in transmission delay times between sensors. Further, the time needed for oscillation to propagate through the interior of the pen may be ignored owing to cancellation between two sensors. This means that transmission delay time because of transmission through the interior of the pen (especially the pen tip) is not affected by a change in temperature, erroneous input due to an environmental change is eliminated and there is no decline in precision caused by such environmental change.

Furthermore, since the sensor selected as the reference sensor is that which oscillation reaches earliest, all of the time-difference signals (Δtp, Δtg) obtained are identical in sign. Accordingly, not only is electrical detection facilitated but the procedure for coordinate calculation is simplified as well because it is unnecessary to discriminate the sign of Δd.

It should be noted that effects identical with those described above can be obtained even if the sensor serving as the reference is made the sensor which oscillation reaches last.

THIRD EMBODIMENT

The coordinate input apparatus and the main body of the third embodiment have the same construction as shown in FIG. 1, and the oscillation pen 3 has the same construction as depicted in FIG. 2.

Figure 9:
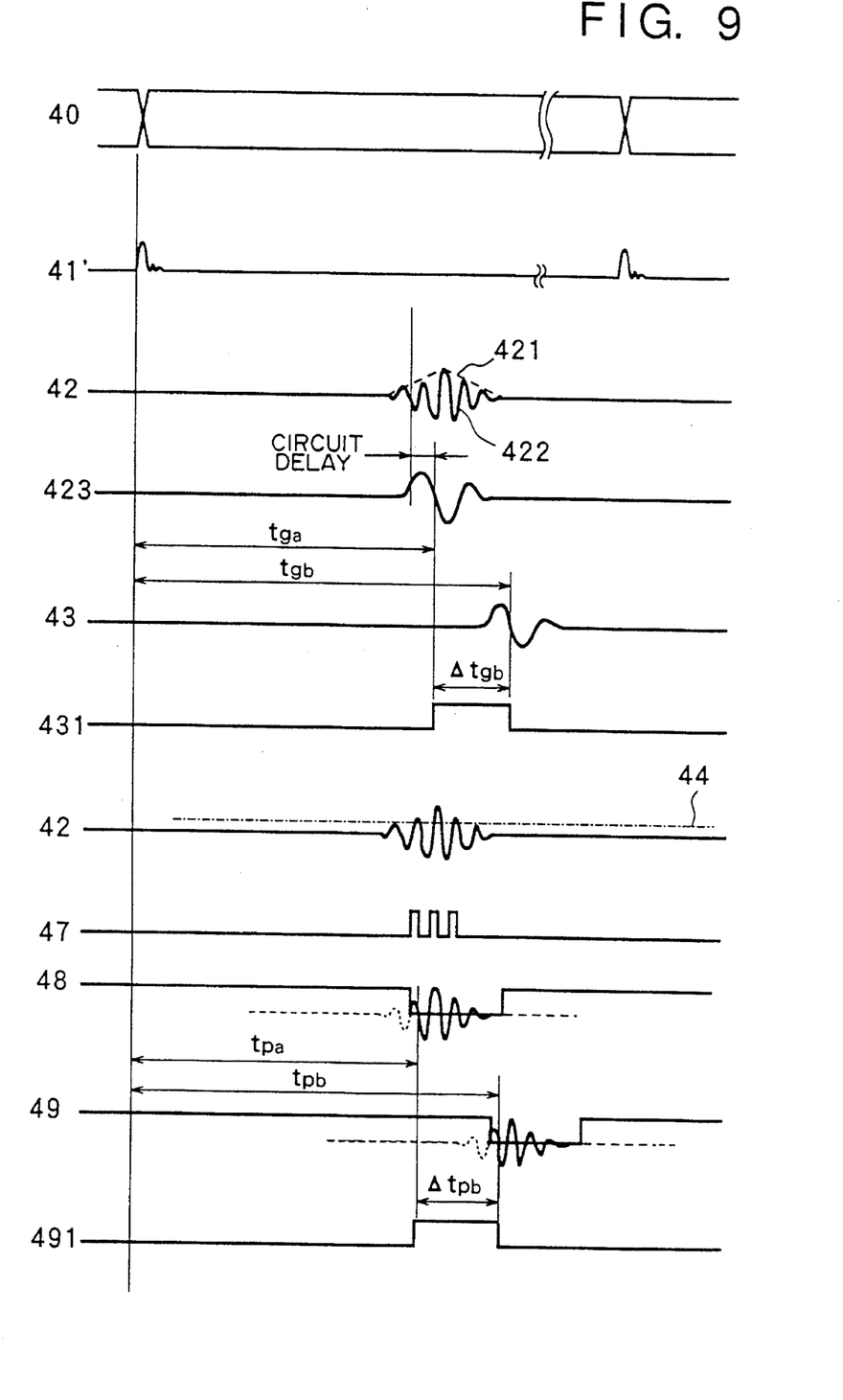
FIG. 9 is a timing chart of signal processing according to another embodiment.

FIG. 9 is a diagram for describing the signal waveforms that enter the detecting circuit 9 as well as processing for measuring transmission delay time based upon these waveforms. Signals from 42 onward are identical those in the first embodiment. Only signals 40 and 41' are different.

The square wave 40, which is a signal generated by the pen timer 22 of the oscillating pen 3, has a large pulse width and is not synchronized to the detecting circuit 9. The square wave 40 is subjected to rectification processing by the oscillator circuit 23, after which the rectified signal is applied to the oscillator 4 as the drive signal 41. The processing of the oscillation transmitted from the oscillator 4 to the oscillation transmitting tablet 8 is that same as in the first embodiment and need not be described again. The processing for rectifying the drive signal in the oscillating pen 3 will be described.

PROCESSING FOR RECTIFYING DRIVE SIGNAL

The processing for rectifying the square wave 40 performed by the drive circuit 2 of the oscillating pen 3 will now be described.

Figure 10:
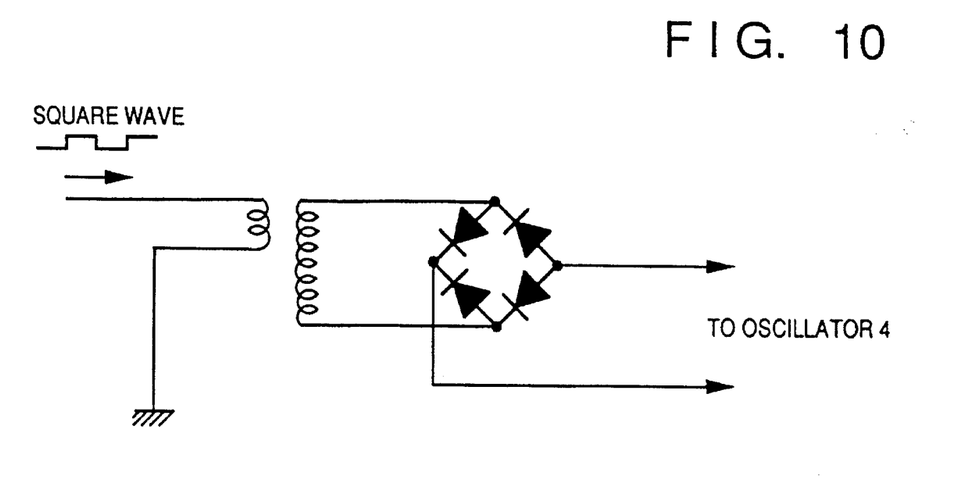
FIG. 10 is a circuit diagram showing a rectifying circuit.

FIG. 10 is a circuit diagram showing an example of a rectifying circuit provided in the output stage of the oscillator circuit 23 in the drive circuit 2. The processing of the drive signal can be performed in a simple manner by a combination of diodes and one transformer. This rectifying circuit converts the square wave 40 into the drive signal 41'. If the oscillator 4 is driven by the square waveform 40, the detected waveform when the drive signal starts at the leading edge of the square wave would be 180° out of phase with the detected waveform when the drive signal starts at the trailing edge of the square wave. However, by executing rectification processing, the phase shift of the detected waveform is eliminated since the drive signal starts at the leading edge regardless of the drive timing.

Accordingly, the drive waveform for driving the oscillator 4 can be made to have the same shape at all times. This enables the oscillation pen 3 to be driven by a low-frequency timer without erroneous detection, thereby making it possible to reduce the power consumed by the pen 3.

Figure 11A:
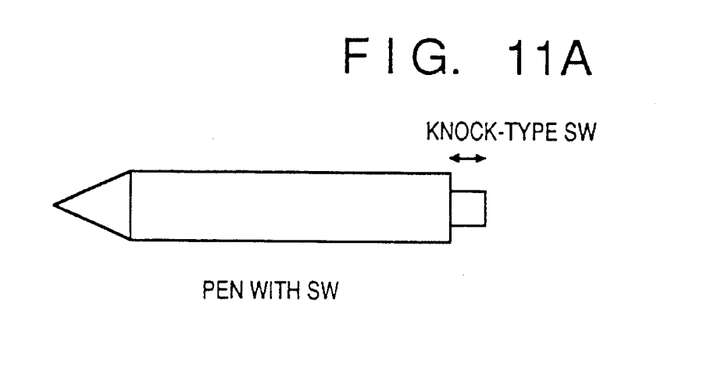
FIGS. 11A and 11B are external views of the oscillating pen.
Figure 11B:
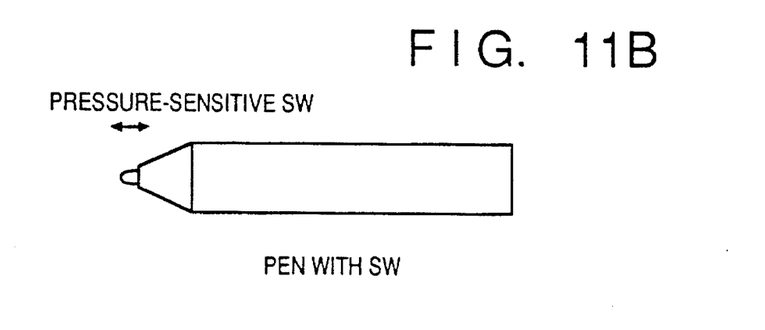

The pen 3 may be provided with a knock-type switch, as shown in FIG. 11A, or the tip 5 may be provided with a pressure-sensitive power-supply switch, as illustrated in FIG. 11B. This makes it possible to reduce power consumption further by supplying power only when the pen 3 is used.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus for sensing a designated coordinate position, comprising:

an oscillation source for generating oscillation;

oscillation transmission means for transmitting the oscillation;

a plurality of sensing means for sensing oscillation transmitted by said oscillation transmission means, wherein each of the sensing means senses the oscillation at predetermined points, respectively;

first measuring means for measuring first time differences between a phase-delay time at which reference sensing means senses a certain oscillation and phase-delay times at which this oscillation is sensed by sensing means other than the reference sensing means included in said plurality of sensing means, wherein one of said plurality of sensing means is made to serve as said reference sensing means;

second measuring means for measuring second time differences between a time at which reference sensing means senses an envelope of a certain oscillation and times at which an envelope of this oscillation is sensed by sensing means other than the reference sensing means included in said plurality of sensing means, wherein one of said plurality of sensing means is made to serve as said reference sensing means; and calculating means for calculating a position of said oscillation source based upon the first and second time differences measured by said first and second measuring means, respectively.

2. The apparatus according to claim 1, further comprising discriminating means for discriminating which of said plurality of sensing means senses oscillation earliest;

said first and second measuring means adopting the sensing means, which is discriminated by said discriminating means as being the earliest to sense the oscillation, as said reference sensing means.

3. The apparatus according to claim 1, wherein said reference sensing means is predetermined.

4. The apparatus according to claim 1, wherein said oscillation source generates oscillation intermittently at a prescribed period.

5. The apparatus according to claim 1, wherein said oscillation source is asynchronous with respect to said measuring means.

6. The apparatus according to claim 1, wherein said oscillation source comprises:

signal generating means for generating a square-wave signal at a prescribed frequency;

rectifying means for rectifying the square-wave signal generated by said signal generating means; and oscillating means for oscillating in phase with leading and trailing edges of the square wave on the basis of the signal rectified by said rectifying means.

7. The apparatus according to claim 6, wherein said signal generating means is asynchronous with respect to said measuring means.

8. The apparatus according to claim 6, wherein said oscillation source further comprises power-supply means for supplying power.

9. The apparatus according to claim 6, wherein said oscillation source further comprises switch means for delivering and cutting off the power supplied by said power-supply means.

10. A coordinate input method for detecting coordinate position from oscillation inputted on an oscillation transmitting tablet, comprising:

a detecting step of detecting oscillation, which is transmitted by the oscillation transmitting tablet, at a plurality of mutually different positions;

a first measuring step of measuring time differences between a phase-delay time at which oscillation is detected at a reference position and phase-delay times at which this oscillation is detected at positions other than the reference position included in the plurality of mutually different positions, wherein one of the plurality of positions serves as said reference position;

a second measuring step of measuring time differences between a time at which an envelope of oscillation is detected at a reference position and times at which an envelope of this oscillation is detected at positions other than the reference position included in the plurality of mutually different positions, wherein one of the plurality of positions serves as said reference position; and a calculating step of calculating position of an oscillation source based upon the first and second time differences measured at said first and second measuring step.

11. The method according to claim 10, further comprising a discriminating step of discriminating at which of said plurality of positions oscillation is sensed earliest;

said first and second measuring steps adopting the position, which is discriminated at said discriminating step as being the earliest at which oscillation is sensed, as said reference position.

12. The apparatus according to claim 1, wherein said calculating means calculates the distances from said oscillation source to each of the predetermined points at which said sensing means senses the oscillation using the first and second time differences and obtains a coordinate of the position of said oscillation means from the distances.

13. The apparatus according to claim 1, wherein each of said plurality of sensing means includes an oscillation sensor arranged at the predetermined point.

* * * * *

UNITED STATES PATENT AND TRADEMARK OFFICE
CERTIFICATE OF CORRECTION

PATENT NO. : 5,539,160

DATED : July 23, 1996

INVENTORS : Masaki Tokioka, et al.

It is certified that error appears in the above-identified patent and that said Letters Patent is hereby corrected as shown below:

COLUMN 8

Line 25, "i" should be deleted;
Line 39, $\Delta d_{c)}/Y$" should read --$\Delta d_c)/Y$--; and
Line 57, "$d_{c=dd}$" should read --$d_c=d_d$--.

Signed and Sealed this

Seventeenth Day of December, 1996

Attest:

BRUCE LEHMAN

Attesting Officer   Commissioner of Patents and Trademarks